Dec. 7, 1926.
J. B. SHELTON
1,609,780
COMBINED ADJUSTABLE STOCK AND FREIGHT CAR
Filed March 15, 1926    3 Sheets-Sheet 2
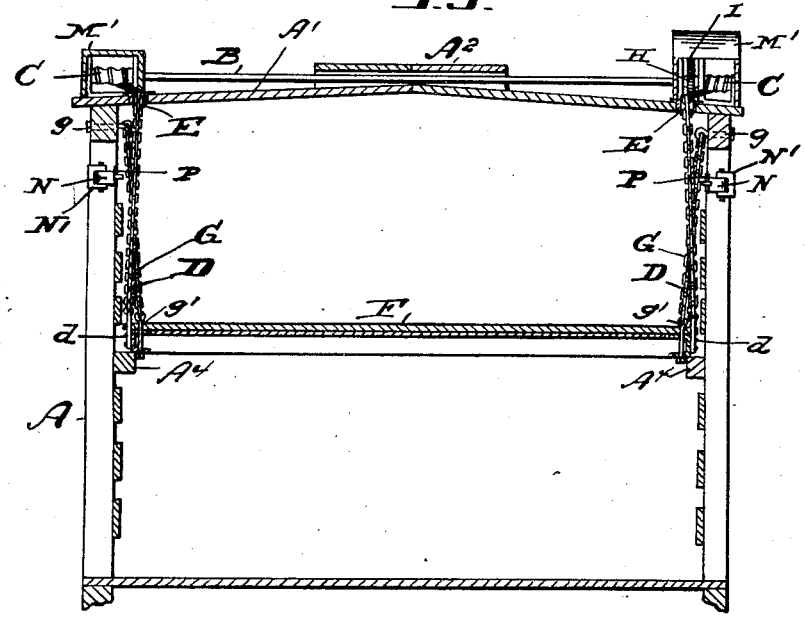
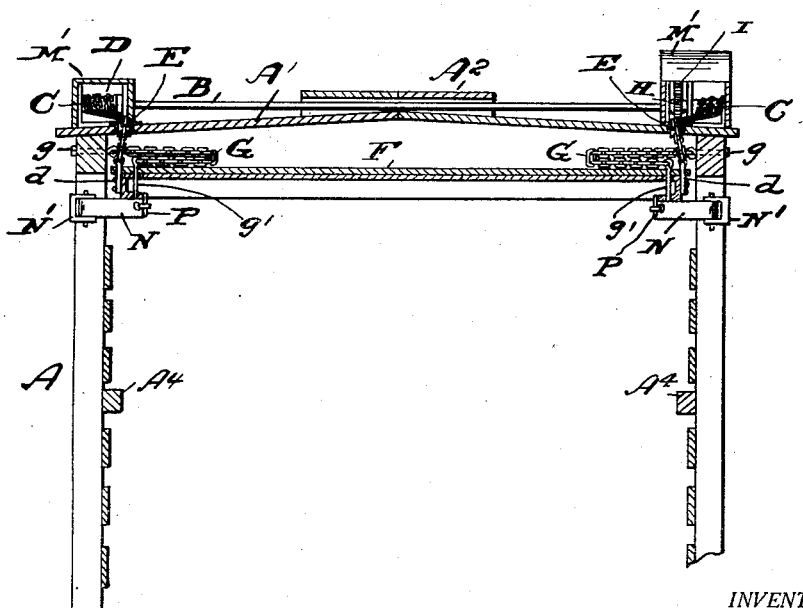
INVENTOR.
John Bell Shelton
BY
S. E. Thomas
ATTORNEY.

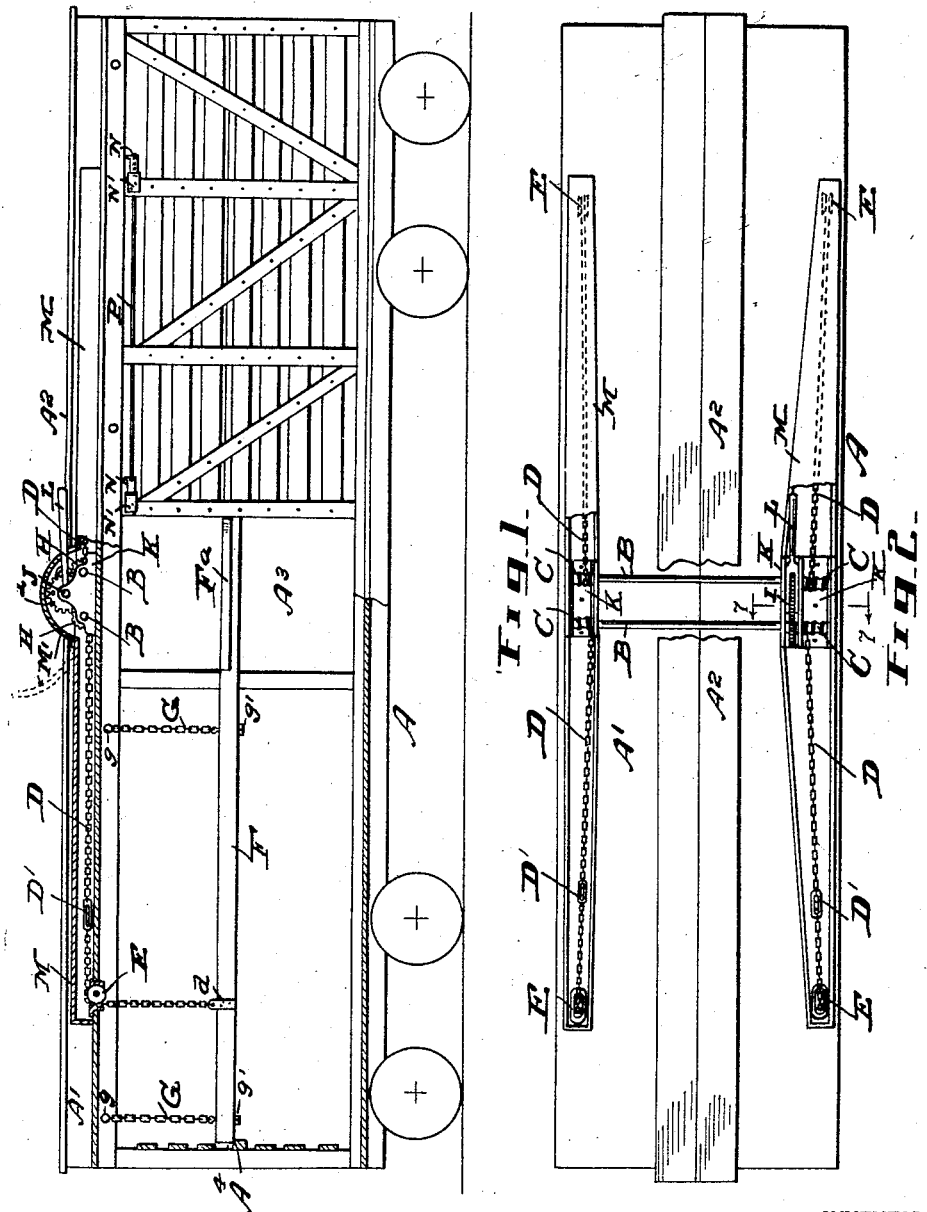

Dec. 7, 1926.

J. B. SHELTON 1,609,780

COMBINED ADJUSTABLE STOCK AND FREIGHT CAR

Filed March 15, 1926   3 Sheets-Sheet 3

INVENTOR.
John Bell Shelton
BY
S. E. Thomas
ATTORNEY.

Patented Dec. 7, 1926.

1,609,780

UNITED STATES PATENT OFFICE.

JOHN BELL SHELTON, OF LOS ANGELES, CALIFORNIA, ASSIGNOR TO SHELTON ADJUSTABLE DOUBLE DECK CAR COMPANY, OF SAN FRANCISCO, CALIFORNIA, A CORPORATION OF CALIFORNIA.

COMBINED ADJUSTABLE STOCK AND FREIGHT CAR.

Application filed March 15, 1926. Serial No. 94,748.

My invention relates to an adjustable stock and freight car shown in the accompanying drawings and particularly described in the following specification and claims.

The primary object of this invention is to provide a double deck car adapted to receive relatively small stock on the main floor of the car and also upon the adjustable platform.

Another object of this invention consists in providing means for raising and lowering the platform while standing upon the roof of the car thus avoiding the necessity of crawling inside the car on filthy floors as has been heretofore necessary in cars of adjustable double deck construction.

A further object of the invention is to provide means for quickly and easily raising the adjustable platform beneath and adjacent the roof of the car in order that the platform may be out of the way when it is desired to use the car for larger stock or freight.

One of the features of the present invention consists of two transverse winding shafts journaled in suitable bearings located on the roof on opposite sides of the car above the doorways, with a manually operated oscillating lever cooperating with a train of gears adapted to actuate the winding shafts on the roof of the car.

To these winding shafts are secured a plurality of hoisting chains extending in opposite directions toward the ends of the car thence over pulleys down through openings in the roof where they are connected with the adjustable platform.

This mechanism is located adjacent to the outer wall of the car, the hoisting chains and gear mechanism being inclosed by a suitable housing,—for protection against the weather,—with a hinged cover over the gears which may be raised for inspection of the mechanism.

Another feature of the invention consists in so arranging the winding shafts that while above the roof of the car they pass under the running board and are therefore out of the way of trainmen using the latter.

Another feature of the invention consists in providing a plurality of supporting chains of uniform length, one end being attached to the platform and the other to the frame of the car to assist in supporting the platform when lowered for loading, the platform when lowered resting preferably upon the usual belt rail bolted to the upright members of the car frame.

Another feature of the invention consists in providing swinging supporting brackets attached to the upright members of the car frame and linked together for simultaneous movement,—adapted to be swung under the platform to support the latter when raised adjacent to the car roof.

Another feature of the invention consists in providing a plurality of relatively short spirally grooved shafts provided with squared sockets to receive the squared ends of the winding shafts, the purpose of the spiral grooves being to guide the chains as they are wound thereon that the chain may not become entangled or wound upon itself when raising the platform.

With the foregoing and other objects in view which will appear as the description proceeds the invention further resides in the combination and arrangement of parts and in the details of construction hereinafter described and claimed it being understood that changes may be made in the precise embodiment of the invention herein disclosed without departing from the spirit of the same.

In the drawings accompanying this specification:

Figure 1 is a side elevation of a car with one portion in longitudinal section showing the adjustable platform lowered to the limit of its downward movement,—controlled by the length of the supporting chains attached to the floor sills of the platform and the wall plate of the car frame.

Figure 2 is a plan view of a car with parts broken away and in section, showing the transversely disposed winding shafts and the chains for raising and lowering the movable platform.

Figure 3 is a cross sectional view through the car showing the adjustable deck in its lowered position.

Figure 4 is a similar cross sectional view showing the adjustable deck raised adjacent the roof of the car and supported upon swinging supporting brackets pivoted to fittings secured to upright members of the car frame.

Figure 5:
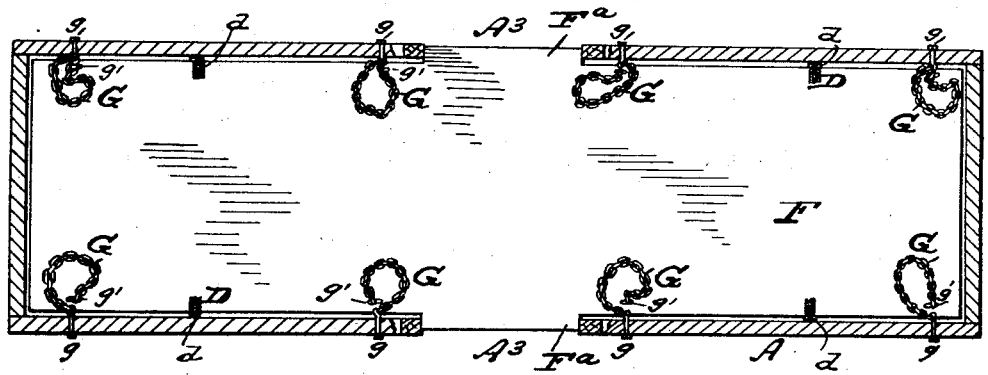
Figure 5 is a horizontal sectional view through the body of the car showing the adjustable deck and supporting chains coiled upon the deck with filler blocks attached to the adjustable platform extending into the door openings at each side of the car.
Figure 6:
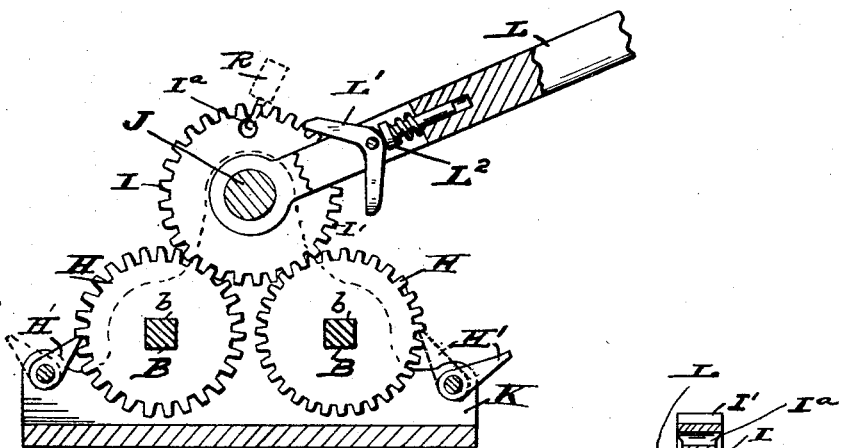
Figure 6 is a cross sectional view showing a detail of the gears for winding the transverse shafts and means for manually actuating the same, showing in dotted lines a padlock projecting through a hole in the gears to prevent unlawful tampering.
Figure 7:
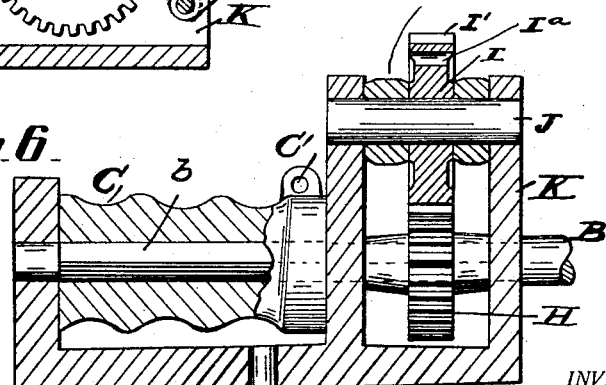
Figure 7 is a cross sectional view through the winding gears and spirally grooved shafts on which the hoisting chain is wound,—taken on or about line 7—7 of Figure 2.

Referring now to the letters of reference placed upon the drawings:

A denotes a stock or freight car. B—B are winding shafts extending transversely across the roof $A^1$ of the car, beneath the running board $A^2$ and directly above the usual central door openings $A^3$ at each side of the car. The squared ends $b$ of the shafts are fitted with spirally grooved sleeves C—C having lugs $C^1$ to which are secured hoisting chains D—D extending in opposite directions over pulleys E—E journaled in a suitable housing near each end, at the sides of the car. F is an adjustable platform to which the hoisting chains D—D are attached at $d$. G indicates a plurality of supporting chains of uniform length attached by heavy bolts $g$ to the wall plate of the frame of the car and at $g^1$ to the sills of the adjustable deck. These chains are of uniform length so that the platform when lowered will be at a pre-determined level and preferably resting upon the usual belt rail $A^4$, bolted to the upright framing of the car. To remove "slack" that may occur in the hoisting chains, suitable turn buckles $D^1$ are provided upon adjusting which any "stretch" in the chain may be taken up. Mounted on the squared ends of the winding shafts are pinions H—H in mesh with a gear I, mounted on a shaft J journaled in a supporting frame K, secured to the roof of the car. L is a lever sleeved on the shaft J for manually operating the gear I. The lever L is provided with a double acting dog $L^1$ adapted to engage the teeth $I^1$ of a gear I for rotating the latter. $L^2$ is a spring actuated plunger bearing upon the dog $L^1$ for maintaining the dog in proper position to engage the teeth when the lever is alternately actuated in opposite directions. $H^1$—$H^1$ are dogs pivoted to the frame K, adapted to be manually shifted to alternately engage the teeth of the pinions H—H, when actuated through the operation of the lever L and gear I to raise or lower the platform. M is a suitable housing covering the hoisting chains and gearing, provided with a hinged cover $M^1$ over the gearing which may be raised—see dotted lines in Figure 1—for inspection or repairs. Secured to the framing of the car in proper position to receive and support the adjustable platform F when raised are a plurality of swinging brackets N—N, pivoted to supporting fittings $N^1$ bolted to upright members of the car frame. Loosely linked to the outer ends of the swinging brackets and connecting them together is a rail P for simultaneously shifting the brackets into position to support or release the platform as required. Secured to the sides of the adjustable platform F are filler blocks $F^a$ which project into the door openings at the sides of the car. These filler blocks relieve the end walls of the shock resulting from the thrust of the deck when switching the car in the train yards and which might otherwise break the ends of the car due to the swaying of the platform.

To secure the mechanism for raising the platform against unlawful tampering, a padlock R is inserted through a hole $I^a$ in the gear I and locked thereto after the platform has been raised.

Having now indicated the several parts by reference letters, the construction and operation of the invention will be readily understood.

The adjustable platform when not in use is raised adjacent the under side of the roof and is there supported by the swinging brackets N—N or other suitable supporting devices. The car is now in condition for ordinary freight or large stock. When it is desired to lower the platform in order that small stock may be carried on both decks, the swinging brackets are shifted to release the platform,—the gear I is then manually operated to lower the platform to the limit of the supporting chains D—D which are preferably of sufficient length to permit the platform when lowered to rest upon the usual side belt rails $A^4$ extending around the frame of the car. To raise the platform the lever is manually actuated to wind the hoisting chains on the spirally grooved shafts C, thereby raising the platform to the position it initially occupied,—the brackets $N^1$ are then swung beneath the platform to support the latter.

Having thus described my invention what I claim is:

1. In a car of the character described; a pair of winding shafts extending transversely across the car and journaled in suitable bearings; an adjustable platform; a plurality of hoisting chains connected at one end to the platform and at the other to the winding shafts; and means including a train of gears and a lever for manually operating said winding shafts, whereby the platform may be raised and lowered.

2. In a car of the character described; a pair of winding shafts extending transversely across the car and journaled in suitable bearings; an adjustable platform; a plurality of hoisting chains connected at one end to the platform and at the other to the winding shafts; means including a train of gears and a lever for manually operating said winding shafts to raise and lower the platform; and a plurality of supporting chains of uniform length secured at one end to the frame of the car and at the other end to the frame of the adjustable platform, for supporting the platform at a pre-determined level when lowered.

3. In a car of the character described; a pair of winding shafts provided at their ends with spiral grooves to respectively guide a plurality of hoisting chains; a plurality of hoisting chains secured to said winding shafts and extending in opposite directions toward the ends of the car; pulleys adapted to support and guide said chains downwardly within the car; an adjustable platform secured to said hoisting chains; means for manually rotating said winding shafts to raise and lower the platform; and means for supporting the platform when raised.

4. In a car of the character described; a pair of winding shafts provided at their ends with spiral grooves to respectively guide a plurality of hoisting chains; hoisting chains secured to said winding shafts and extending in opposite directions toward the ends of the car; pulleys adapted to support and guide said chains downwardly within the car; an adjustable platform secured to said hoisting chains; means for manually rotating said winding shafts to raise and lower the platform; means for supporting the platform when raised; and a plurality of supporting chains of uniform length secured at one end to the car plate and at the other end to the frame of the adjustable platform.

5. In a car of the character described; a pair of winding shafts extending transversely across the roof of the car below its running board, journaled in bearings bolted to the roof above the side door openings into the car; hoisting chains secured to the respective shafts on each side of the car and respectively extending toward the ends of the car; pulleys adapted to receive and direct said hoisting chains downwardly through openings in the roof; an adjustable platform secured to the hoisting chains; a plurality of supporting chains bolted to the car frame and to the frame of the adjustable platform; means for manually raising the platform adjacent to the under side of the roof; and means for supporting said platform when raised.

6. In a car of the character described; a pair of winding shafts extending transversely across the roof of the car below its running board, journaled in bearings bolted to the roof above the side door openings into the car; hoisting chains secured to the respective shafts on each side of the car and respectively extending toward the ends of the car; pulleys adapted to receive and direct said hoisting chains downwardly through openings in the roof; an adjustable platform secured to the hoisting chains; a housing covering said hoisting chains; a plurality of supporting chains bolted to the car frame and to the frame of the adjustable platform; means for manually raising the platform adjacent to the under side of the roof; and means for supporting said platform when raised.

7. In a car of the character described; a pair of winding shafts extending transversely across the car and journaled in suitable bearings; an adjustable platform; a plurality of hoisting chains connected at one end to the platform and at the other end to the winding shafts; means including a train of gears and a lever for manually operating said winding shafts to raise and lower the platform; housings for said hoisting chains and the gears for operating the winding shafts; a hinged cover for the housing over said gears; and a plurality of supporting chains of uniform length secured at one end to the frame of the car and at the other end to the frame of the adjustable platform, for supporting the platform at a predetermined level when lowered.

8. In a car of the character described; an adjustable platform; a plurality of supporting chains secured at one end to the adjustable platform and at the other end to the car frame; a pair of winding shafts extending transversely across the car roof below the running board and journaled in bearings bolted to the roof above the side door openings into the car; a pair of spirally grooved castings having squared sockets adapted to receive the squared ends of the winding shafts; a plurality of hoisting chains respectively secured at one end to the spirally grooved castings on the ends of the winding shafts and at the other end to the adjustable platform; pulleys for supporting and guiding said hoisting chains; a pair of pinions respectively fitted to the squared ends of the winding shafts; a pair of dogs adapted to engage the pinions; a gear in mesh with said pinions mounted on a stub shaft in a supporting frame; and a manually operated oscillating lever fitted with a double acting dog adapted to engage the teeth of the gear, whereby the winding shafts may be rotated in either direction to raise or lower the adjustable platform.

In testimony whereof, I sign this specification.

JOHN BELL SHELTON.